(12) United States Patent
Wu et al.

(10) Patent No.: US 11,410,386 B2
(45) Date of Patent: Aug. 9, 2022

(54) METHOD AND SYSTEM FOR RECONSTRUCTING TRANSPARENT OBJECTS BASED ON MULTI-WAVELENGTH LIGHT TRACING

(71) Applicant: SHENZHEN TECHNOLOGY UNIVERSITY, Guangdong (CN)

(72) Inventors: Qingyang Wu, Guangdong (CN); Xiaoting Lu, Guangdong (CN); Haotao Huang, Guangdong (CN); Zhijun Zhang, Guangdong (CN)

(73) Assignee: SHENZHEN TECHNOLOGY UNIVERSITY, Shenzhen (CN)

( * ) Notice: Subject to any disclaimer, the term of this patent is extended or adjusted under 35 U.S.C. 154(b) by 0 days.

(21) Appl. No.: 17/146,472

(22) Filed: Jan. 11, 2021

(65) Prior Publication Data

US 2022/0084285 A1 Mar. 17, 2022

(30) Foreign Application Priority Data

Sep. 17, 2020 (CN) .......................... 202010980597.6

(51) Int. Cl.
*G01B 11/24* (2006.01)
*G06T 17/20* (2006.01)
*G06T 7/80* (2017.01)
*G06T 7/73* (2017.01)
*G09G 3/34* (2006.01)

(52) U.S. Cl.
CPC .............. *G06T 17/20* (2013.01); *G01B 11/24* (2013.01); *G06T 7/73* (2017.01); *G06T 7/80* (2017.01); *G09G 3/3406* (2013.01); *G06T 2210/56* (2013.01); *G09G 2360/147* (2013.01)

(58) Field of Classification Search
CPC . G01B 11/24–255; G06T 17/00; G06T 17/20; G06T 17/30
See application file for complete search history.

(56) References Cited

U.S. PATENT DOCUMENTS

| | | | | |
|---|---|---|---|---|
| 2019/0178816 A1* | 6/2019 | Kubiak | ................ | G01N 21/958 |
| 2020/0035022 A1* | 1/2020 | Huang | ....................... | G06T 7/50 |
| 2020/0393238 A1* | 12/2020 | Zhuang | .................. | G01B 11/06 |

\* cited by examiner

*Primary Examiner* — Ryan McCulley

(57) ABSTRACT

The present application provides a method and system for reconstructing transparent objects based on multi-wavelength light tracing, the method comprises calculating and obtaining a reverse light equation of one pixel point of a camera by using intrinsic parameters of camera calibration; placing a transparent object on a display screen, emitting, by a backlight lighting source, lights of two or more different wavelengths to the display screen, and recording, by the pixel point, position information of the lights of two or more different wavelengths on the display screen, respectively; translating the display screen along a direction perpendicular thereto, and calculating a rectilinear equation of light from a lower surface of the transparent object to the display screen of the lights of different wavelengths recorded by the pixel point.

4 Claims, 2 Drawing Sheets

METHOD AND SYSTEM FOR RECONSTRUCTING TRANSPARENT OBJECTS BASED ON MULTI-WAVELENGTH LIGHT TRACING

CROSS REFERENCE TO RELATED APPLICATION

The present application claims priority to China patent application No. 202010980597.6, entitled "METHOD AND SYSTEM FOR RECONSTRUCTING TRANSPARENT OBJECTS BASED ON MULTI-WAVELENGTH LIGHT TRACING", filed on Sep. 17, 2020, the entire content of which is incorporated herein by reference.

TECHNICAL FIELD

The present application relates to the technical field of three-dimensional measurement, and in particular to a method and system for reconstructing transparent objects based on multi-wavelength light tracing.

BACKGROUND

For the reconstruction of transparent objects, a common system of fringe projection profilometry is a camera-display system. Although people have great interest in the digitization of objects, it is still a great challenge to obtain digital models of transparent or highlight objects. Because a refractive surface and a highlight surface change a rectilinear light into piecewise linear light, which increases the complexity of the reconstruction. Traditional methods include numerical methods combining normal consistency, multi-view methods, etc., but the accuracy and robustness are not high.

SUMMARY

In view of the shortcomings of the prior art, the present application provides a method and system for reconstructing transparent objects based on multi-wavelength light tracing, which aim to solve the reconstruction problem of transparent objects, and have high precision and high robustness.

In order to solve the above technical problems, the present application adopts the following embodiments:

The first embodiment provides a method for reconstructing transparent objects based on multi-wavelength light tracing, comprising the steps of:

calculating and obtaining a reverse light equation of one pixel point of a camera by using intrinsic parameters of camera calibration, which is called the first segment light equation;

placing a transparent object on a display screen, emitting, lights of two or more different wavelengths to the display screen by a backlight lighting source, and recording position information of the lights of two or more different wavelengths on the display screen by the pixel point, respectively;

translating the display screen along a direction perpendicular thereto, and calculating a rectilinear equation of light from a lower surface of the transparent object to the display screen of the lights of different wavelengths recorded by the pixel point, which is called the third segment light equation;

denoting an equation of a refractive light inside the transparent object of the lights of different wavelengths reversely traced by the pixel point as the second segment light equation, with a constraint condition of an unique point where the refractive light intersects an upper surface of the transparent object and a constraint condition that a trajectory of the refractive light intersecting with the lower surface of the transparent object satisfies a curve polynomial, and three-dimensional information of one point on an upper surface and multiple points on the lower surface of the transparent object is uniquely determined by combination of the first segment light equation and the third segment light equation;

repeating the above steps, and calculating three-dimensional coordinates of other points on the surface of the transparent object according to imaging light path information of different pixel points of the camera.

The second embodiment provides a system for reconstructing transparent objects based on multi-wavelength light tracing, which is capable of realizing the above-mentioned method for reconstructing transparent objects based on multi-wavelength light tracing, wherein the system comprises:

a backlight lighting source, configured to generate lights of different wavelengths;

a display screen, configured to display a coded stripe and mark a space; and a camera, configured to collect position information of the lights emitted by the display screen.

The embodiment of the present application has the following beneficial effects:

The camera records initial position information of the imaging light path, then the transparent object is placed, and the backlight lighting source emits multi-wavelength light to illuminate the display screen. After the multi-wavelength light passes through the surface of the transparent object, the camera collects the position information of the multi-wavelength light modulated by a height of the surface of the transparent object and a slope of curved surface. Based on mathematical theoretical derivation of multi-wavelength light tracing model and the two constraint conditions mentioned above, the three-dimensional coordinates of the surface of the transparent object can be calculated. The method of reconstruction can uniquely determine the three-dimensional coordinates of the points on the surface of the transparent object, so as to realize three-dimensional reconstruction of transparent objects with high precision and high robustness.

BRIEF DESCRIPTION OF THE DRAWINGS

The specific structure of the present application will be described in detail below with reference to the accompanying drawings.

DESCRIPTION OF THE EMBODIMENTS

Figure 1:
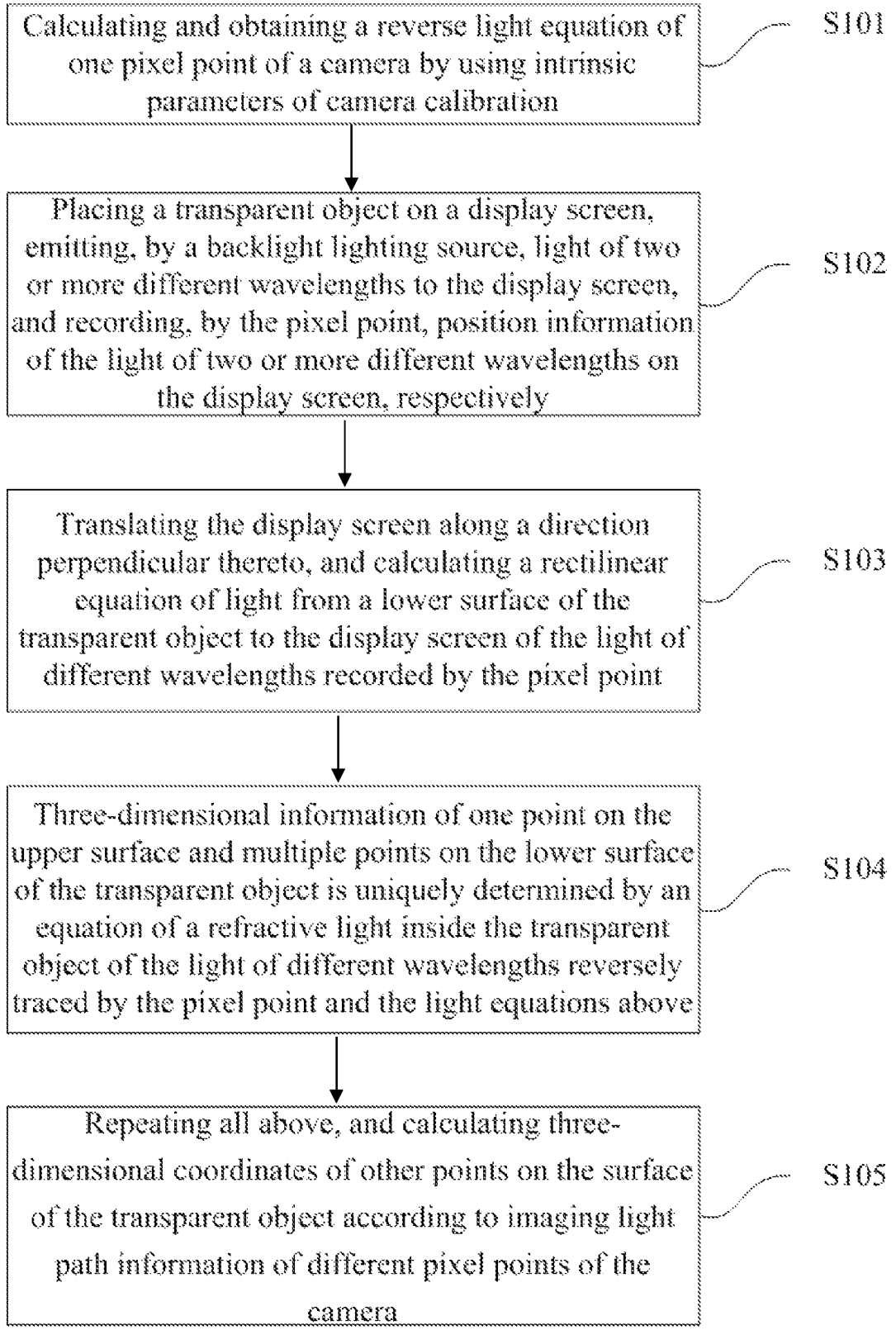
FIG. 1 is a flowchart of a method for reconstructing transparent objects based on multi-wavelength light tracing provided by an embodiment of the present application.

In order to describe in detail the technical content, structural features, achieved objectives and effects of the present application, the following is described in detail in combination with the embodiments and accompanying drawings.

Embodiments of the present application will be described in detail below, examples of the embodiments are shown in the accompanying drawings, wherein the same or similar reference numerals from beginning to end indicate the same or similar elements or elements with the same or similar functions. The embodiments described below with reference to the accompanying drawings are exemplary, and are intended to explain the present application, but should not be construed as limiting the present application.

Please refer to FIG. 1, which is a flowchart of a method for reconstructing transparent objects based on multi-wavelength light tracing according to an embodiment of the present application. As shown in FIG. 1, a method for reconstructing transparent objects based on multi-wavelength light tracing comprising:

Step S101, calculating and obtaining a reverse light equation of one pixel point of a camera by using intrinsic parameters of camera calibration, which is called the first segment light equation.

Specifically, the pixel point is a pixel point of camera imaging, and the first segment light equation is denoted as $h(x)$.

Step S102, placing a transparent object on a display screen, emitting lights of two or more different wavelengths to the display screen by a backlight lighting source, and recording position information of the lights of two or more different wavelengths on the display screen by the pixel point, respectively.

Specifically, taking lights of two different wavelengths as an example here, the position information recorded is denoted as $\varphi_1$ and $\varphi_2$, respectively.

It should be noted that the number of lights of different wavelengths is related to the complexity of a surface shape of the transparent object. The more complex the surface shape is, the more lights of different wavelengths are required, and a simple plane only requires dual-wavelength light.

Step S103, translating the display screen along a direction perpendicular thereto, and calculating a rectilinear equation of light from a lower surface of the transparent object to the display screen of the lights of different wavelengths recorded by the pixel point, which is called the third segment light equation.

The third segment light equations $f_1(x)$ and $f_2(x)$ corresponding to the lights of two different wavelengths are calculated respectively according to position information $\varphi_1'$ and $\varphi_2'$ of the lights of two different wavelengths on the display screen after translation.

Step S104, denoting an equation of a refractive light inside the transparent object of the lights of different wavelengths reversely traced by the pixel point as the second segment light equation, and three-dimensional information of one point on the upper surface and multiple points on the lower surface of the transparent object is uniquely determined by a constraint condition of an unique point where the second segment light equation intersects an upper surface of the transparent object, a constraint condition that the trajectory of intersection between the second segment light equation and the lower surface of the transparent object satisfies the curve polynomial, with combination of the first segment light equation and the third segment light equation.

Specifically, it is assumed that two points where $f_1(x)$ and $f_2(x)$ intersect the lower surface of the transparent object satisfy a high-order curve polynomial $L_{(a,b)}(x)$ with two unknown coefficients, coordinates of intersection points of the second segment light equation and the third segment light equation can be obtained by simultaneous high-order curve polynomial $L_{(a,b)}(x)$ and the third segment light equations $f_1(x)$, $f_2(x)$ respectively. A slope of the second segment light equation can be calculated and obtained by a refractive index $n_1$ of the lights of different wavelengths on the transparent object, a refractive index $n_2$ of the lights of different wavelengths in a measuring environment medium, and differential equations of the simultaneous high-order curve polynomial $L_{(a,b)}(x)$ and the light equations $f_1(x)$, $f_2(x)$ respectively at the intersection points. The second segment light equations $s_1(x)$, $s_2(x)$ corresponding to the lights of two different wavelengths are calculated by substituting the slope of the second segment light equation into the coordinates of the intersection points of the second segment light equation and the third segment light equation calculated above. Then unknown parameters a and b are calculated by simultaneous equations using constraint conditions of unique points on the upper surface of the transparent object where the second segment light equations $s_1(x)$, $s_2(x)$ intersect with the first segment light equation. In such a way that the three-dimensional information of one point on the upper surface and multiple points on the lower surface of the transparent object can be calculated and obtained.

Step S105, repeating all the above steps, and calculating three-dimensional coordinates of other points on the surface of the transparent object according to imaging light path information of different pixel points of the camera.

The embodiment of the present application has the following beneficial effects:

The camera records initial position information of the imaging light path, then the transparent object is placed, and the backlight lighting source emits multi-wavelength light to illuminate the display screen. After the multi-wavelength light passes through the surface of the transparent object, the camera collects the position information of the multi-wavelength lights modulated by a height of the surface of the transparent object and a slope of curved surface. Based on mathematical theoretical derivation of multi-wavelength light tracing model and the two constraint conditions mentioned above, the three-dimensional coordinates of the surface of the transparent object can be calculated. The method of reconstruction can uniquely determine the three-dimensional coordinates of the points on the surface of the transparent object, so as to realize three-dimensional reconstruction of transparent objects with high precision and high robustness.

Another embodiment of the present application provides a method for reconstructing transparent objects based on multi-wavelength light tracing, comprising:

Step S201, calculating and obtaining a reverse light equation of one pixel point of a camera by using intrinsic parameters of camera calibration, which is called the first segment light equation.

Specifically, the pixel point is a pixel point of camera imaging, and the first segment light equation is denoted as $h(x)$.

Step S202, placing a transparent object on a display screen, emitting, by a backlight lighting source, lights of four different wavelengths to the display screen, and recording, by the pixel point, position information of the lights of four different wavelengths on the display screen, respectively.

Specifically, the position information recorded is denoted as $\varphi_1$, $\varphi_2$, $\varphi_3$ and $\varphi_4$, respectively.

Step S203, translating the display screen along a direction perpendicular thereto, and calculating a rectilinear equation of light from a lower surface of the transparent object to the display screen of the lights of different wavelengths recorded by the pixel point, which is called the third segment light equation.

The third segment light equations $f_1(x)$, $f_2(x)$, $f_3(x)$ and $f_4(x)$ corresponding to the lights of four different wavelengths are calculated respectively according to position information φ1', φ2', φ3' and φ' of the lights of four different wavelengths on the display screen after translation.

Step S204, denoting an equation of a refractive light inside the transparent object of the lights of different wavelengths reversely traced by the pixel point as the second segment light equation, and three-dimensional information of one point on the upper surface and multiple points on the lower surface of the transparent object is uniquely determined by a constraint condition of an unique point where the second segment light equation intersects an upper surface of the transparent object, a constraint condition that the trajectory of intersection between the second segment light equation and the lower surface of the transparent object satisfies the curve polynomial, the first segment light equation and the third segment light equation.

Specifically, it is assumed that four points where $f_1(x)$, $f_2(x)$, $f_3(x)$ and $f_4(x)$ intersect the lower surface of the transparent object satisfy a high-order curve polynomial $L_{(a,b,c,d)}(x)$ with four unknown coefficients, coordinates of intersection points of the second segment light equation and the third segment light equation can be obtained by simultaneous high-order curve polynomial $L_{(a,b,c,d)}(x)$ and the third segment light equations $f_1(x)$, $f_2(x)$, $f_3(x)$ and $f_4(x)$ respectively. A slope of the second segment light equation can be calculated and obtained by a refractive index $n_1$ of the lights of different wavelengths on the transparent object, a refractive index $n_2$ of the lights of different wavelengths in a measuring environment medium, and differential equations of the simultaneous high-order curve polynomial $L_{(a,b,c,d)}(x)$ and the light equations $f_1(x)$, $f_2(x)$, $f_3(x)$ and $f_4(x)$ respectively at the intersection points. The second segment light equations $s_1(x)$, $s_2(x)$, $s_3(x)$ and $s_4(x)$ corresponding to the lights of four different wavelengths are calculated by substituting the slope of the second segment light equation into the coordinates of the intersection points of the second segment light equation and the third segment light equation calculated above. Then unknown parameters a, b, c and d are calculated by simultaneous equations using constraint conditions of unique points on the upper surface of the transparent object where the second segment light equations $s_1(x)$, $s_2(x)$, $s_3(x)$ and $s_4(x)$ intersect with the first segment light equation. In such a way that the three-dimensional information of one point on the upper surface and multiple points on the lower surface of the transparent object can be calculated and obtained.

Step S205, repeating all the above steps, and calculating three-dimensional coordinates of other points on the surface of the transparent object according to imaging light path information of different pixel points of the camera.

Figure 2:
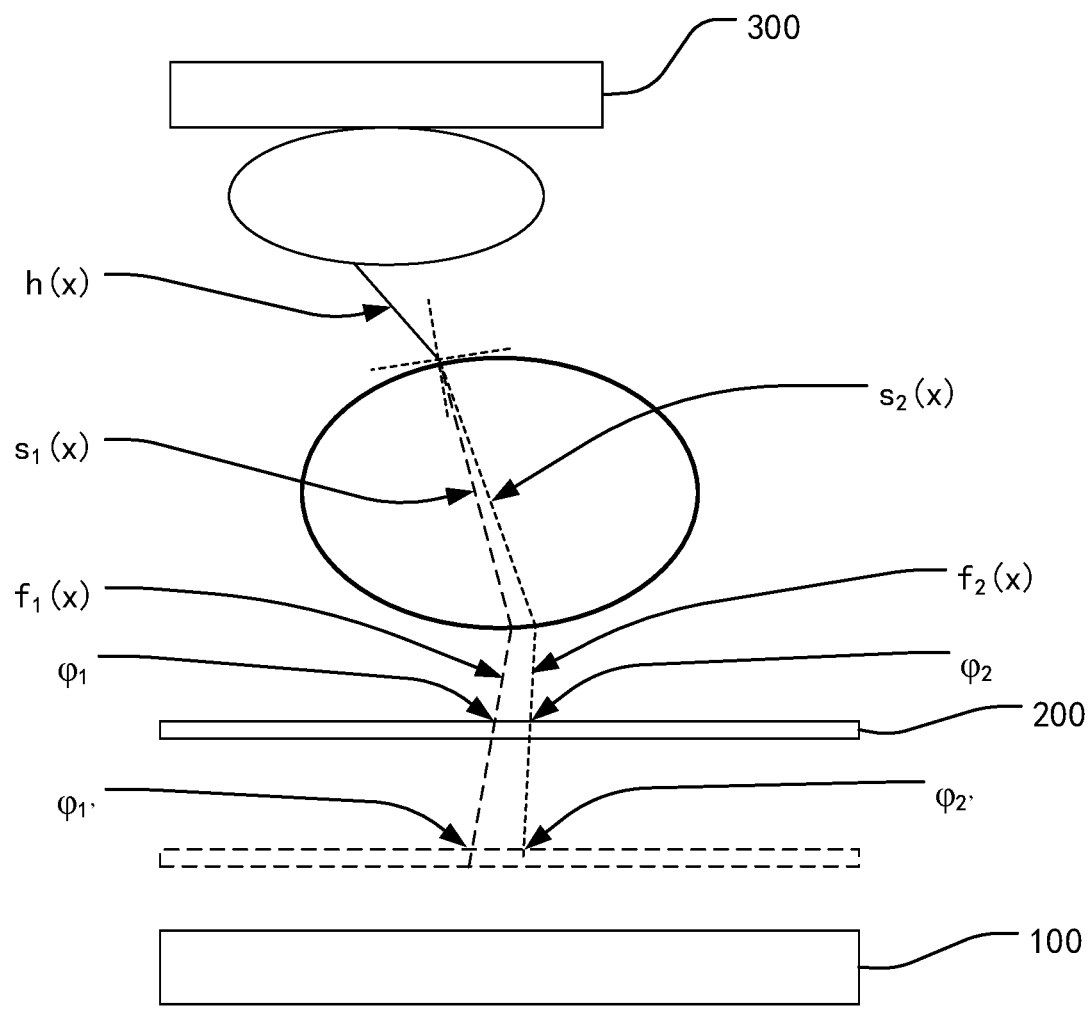
FIG. 2 is a schematic structural diagram of a system for reconstructing transparent objects based on multi-wavelength light tracing provided by an embodiment of the present application.

Please refer to FIG. 2, which is a schematic structural diagram of a system for reconstructing transparent objects based on multi-wavelength light tracing according to an embodiment of the present application. The second embodiment of the present application provides a system for reconstructing transparent objects based on multi-wavelength light tracing, which can realize the above-mentioned method for reconstructing transparent objects based on multi-wavelength light tracing, comprising:

a backlight lighting source 100, configured to generate lights of different wavelengths;

wherein the lights of different wavelengths are lights of two or more different wavelengths;

a display screen 200, configured to display a coded stripe and mark space; and a camera 300, configured to collect position information of the multi-wavelength light emitted by the display screen, and the position information is modulated by intersecting sinusoidal stripes;

wherein the display screen 200 is located between the backlight lighting source 100 and the camera 300.

Further, the multi-wavelength light is a multi-wavelength intersecting coded stripe pattern.

The above are only the embodiments of the present application, and do not limit patent protection scope of the present application. Any equivalent structure or equivalent process transformation made by adopting the content of the description and accompanying drawings of the present application, or direct or indirect application of other related technical fields is similarly included in the patent protection scope of the present application.

What is claimed is:

1. A method for reconstructing transparent objects based on multi-wavelength light tracing, comprising the steps of:
calculating and obtaining a reverse light equation of one pixel point by using intrinsic parameters of a camera calibration, which is called a first segment light equation;
placing a transparent object on a display screen, emitting lights of two or more different wavelengths to the display screen by a backlight lighting source, and recording position information of the lights of two or more different wavelengths on the display screen by the pixel point, respectively;
translating the display screen along a direction perpendicular thereto, and calculating a rectilinear equation of light from a lower surface of the transparent object to the display screen of the lights of different wavelengths recorded by the pixel point, which is called a third segment light equation;
denoting an equation of a refractive light inside the transparent object of the lights of different wavelengths reversely traced by the pixel point as a second segment light equation, with a constraint condition of a unique point where the refractive light intersects an upper surface of the transparent object and a constraint condition that a trajectory of the refractive light intersecting with lithe lower surface of the transparent object satisfies a curve polynomial, and three-dimensional information of one point on the upper surface and multiple points on the lower surface of the transparent object is uniquely determined by combination of the first segment light equation and the third segment light equation;
repeating above steps, and calculating three-dimensional coordinates of other points on a surface of the transparent object according to imaging light path information of different pixel points.

2. The method of claim 1, wherein the lights of different wavelengths are four different wavelengths emitted by the display screen.

3. A system for reconstructing transparent objects based on multi-wavelength light tracing, which is configured to realize the method for reconstructing transparent objects based on multi-wavelength light tracing of claim 1, wherein the system comprises:
a backlight lighting source, configured to generate lights of different wavelengths;
a display screen, configured to display a coded stripe and mark a space; and
a camera, configured to collect position information of the lights emitted by the display screen.

4. The system of claim 3, wherein the multi-wavelength light is a multi-wavelength intersecting coded stripe pattern.

* * * * *